United States Patent
Millner

(10) Patent No.: US 10,708,138 B2
(45) Date of Patent: Jul. 7, 2020

(54) SYSTEM AND METHOD FOR AN IMPROVED PLACEMENT OF STORAGE RESOURCES ON NODES IN NETWORK

(71) Applicant: DATERA, INC., Sunnyvale, CA (US)

(72) Inventor: Robert Louis Millner, San Jose, CA (US)

( * ) Notice: Subject to any disclaimer, the term of this patent is extended or adjusted under 35 U.S.C. 154(b) by 0 days.

(21) Appl. No.: 15/618,152

(22) Filed: Jun. 9, 2017

(65) Prior Publication Data

US 2018/0359153 A1    Dec. 13, 2018

(51) Int. Cl.
*H04L 12/24* (2006.01)

(52) U.S. Cl.
CPC .......... *H04L 41/12* (2013.01); *H04L 41/0853* (2013.01)

(58) Field of Classification Search
None
See application file for complete search history.

(56) References Cited

U.S. PATENT DOCUMENTS

| | | | |
|---|---|---|---|
| 9,225,591 B2 | 12/2015 | Beheshti-Zavareh et al. | |
| 9,342,342 B2 | 5/2016 | Aslot et al. | |
| 9,369,426 B2 | 6/2016 | Koponen et al. | |
| 2004/0210654 A1* | 10/2004 | Hrastar | H04L 41/12 709/224 |
| 2007/0124453 A1* | 5/2007 | Slaughter | H04L 45/02 709/223 |
| 2010/0332490 A1* | 12/2010 | Bauer | G06Q 10/06 707/759 |
| 2013/0103739 A1* | 4/2013 | Salgueiro | H04L 41/12 709/203 |
| 2013/0114462 A1* | 5/2013 | Pignataro | H04L 41/12 370/254 |
| 2013/0227116 A1* | 8/2013 | Radhakrishnan | H04L 41/0823 709/224 |
| 2014/0317167 A1* | 10/2014 | Wahl | H04L 41/12 709/201 |
| 2015/0242416 A1* | 8/2015 | Nakano | G06F 11/2257 707/694 |
| 2015/0356005 A1 | 12/2015 | Hayes et al. | |
| 2017/0026263 A1 | 1/2017 | Gell et al. | |

FOREIGN PATENT DOCUMENTS

WO    2012118878 A1    9/2012

OTHER PUBLICATIONS

Fung Po Tso, Network and server resource management strategies for data centre infrastructures: A survey published on Sep. 4, 2016.
Amin Vahdat Scale-Out networking in the data center published on Jul./Aug. 2010.

* cited by examiner

*Primary Examiner* — Clayton R Williams
*Assistant Examiner* — Christopher B Robinson
(74) *Attorney, Agent, or Firm* — Barry Choobin; Patent 360

(57) ABSTRACT

The present disclosure relates to device in a network. The device includes an obtaining module, a storage module, and a determination module. The obtaining module is configured to obtain topology information associated with one or more nodes available in a network. The storage module is configured to store the topology information obtained along with meta-information associated with the topology information, if any. The determination module is configured to determine placement of at least storage resources on at least one node selected from the one or more nodes based on the topology information and the meta-information.

2 Claims, 2 Drawing Sheets

SYSTEM AND METHOD FOR AN IMPROVED PLACEMENT OF STORAGE RESOURCES ON NODES IN NETWORK

TECHNICAL FIELD

The present invention relates to analysing a network topology, in particular to utilizing the network topology of the network in making storage node placement decisions.

BACKGROUND

Background description includes information that may be useful in understanding the present invention. It is not an admission that any of the information provided herein is prior art or relevant to the presently claimed invention, or that any publication specifically or implicitly referenced is prior art.

Conventionally known, a network topology is the arrangement of a network, including its nodes and connecting lines. There are two ways of defining network geometry: the physical topology and the logical (or signal) topology.

The physical topology of a network is the actual geometric layout of workstations. Nodes can be placed at various locations in a structure to distribute data and/or collect data. Similarly, storage resources can be placed on the nodes for holding the data. For example, a node can include a sensor, a wireless router, and/or a camera. During installation of nodes, a site survey team can design a network topology for the placement of the nodes. The design can be provided to a contractor, who can install the nodes according to the design. However, the placement of storage resources on the nodes are much difficult than mere placement of the nodes since mistakes can be made by the contractor due to unavailability of an accurate information about the actual storage of data while operation of these nodes, which ultimately results in an incorrect placement of storage resources on the nodes.

As such, incorrect placement of a node can affect distribution and/or collection of data. For instance, an incorrectly placed wireless router can result in an area not receiving a wireless signal and/or an area receiving a degraded wireless signal. Alternatively, and/or in addition, data and/or images may not be collected from an area if storage resources on a sensor and/or camera are placed in an incorrect manner.

Further, the technical problems that were observed in the existing distributed, scale-out storage system and/or Layer 3 (L3) network was that, the systems could not consume the topology information for a L3 network and was unaware of the network's view of common failure modes, and the efficiency of paths between nodes and clients or other nodes.

Thus, there is a dire need to provide a system and method that efficiently and economically utilizes the network topology of an L3 network in making storage placement decisions.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context.

The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

SUMMARY

The present invention mainly solves the technical problems of the prior art existed. In response to these problems, the present invention provides a system and method that efficiently and economically utilizes the network topology of an L3 network in making storage placement decisions. The present invention improve efficiency and resilience of the communications between clients and nodes, and between the nodes of a distributed, scale-out storage system by participating in the topology of an L3 network.

An aspect of the present disclosure relates to a method that comprises the steps of obtaining, by a processor of an computing device, topology information associated with one or more nodes available in a network, storing, by the processor, the topology information obtained along with meta-information associated with the topology information, if any, and determining, by the processor, placement of at least storage resources on at least one node selected from the one or more nodes based on the topology information and the meta-information.

In an aspect, the step of determining further includes at least subset resources associated with the at least one node having the storage resources placed, wherein the subset resources are any or combination of a flash, a disk, and network interface types.

In an aspect, the step of determining further includes determining at least subset resources associated with the at least one node having the storage resources placed, wherein the subset resources are any or combination of a flash, a disk, and network interface types.

In an aspect, the step of determining further includes determining if the topology information and/or meta-information of the network is different than the topology information and/or meta-information of the network read in a previous instance, and then determining the changes to be made in the node placement or resource configuration of the storage resource.

In an aspect, the step of obtaining further includes periodically scanning the one or more nodes available in the network to obtain topology information associated with one or more nodes.

In an aspect, the step of obtaining further includes obtaining, based on a triggered event, topology information associated with one or more nodes available in a network, the triggered event is any or combination of user triggered event or an automated event or a pre-configured event.

An aspect of the present disclosure relates to device in a network. The device includes a non-transitory storage device having embodied therein one or more routines operable to makes a storage resource placement decision among one or more nodes of the network based on network topology information and one or more processors coupled to the non-transitory storage device and operable to execute the one or more routines.

The one or more routines include an obtaining module, a storage module, and a determination module. The obtaining module is configured to obtain topology information associated with one or more nodes available in a network. The storage module is configured to store the topology information obtained along with meta-information associated with the topology information, if any. The determination module is configured to determine placement of at least storage resources on at least one node selected from the one or more nodes based on the topology information and the meta-information.

In an aspect, the determination module is further configured to determine at least subset resources associated with the at least one node having the storage resources placed, wherein the subset resources are any or combination of a flash, a disk, and network interface types.

In an aspect, the determination module is further configured to determine if the topology information and/or meta-information of the network is different than the topology information and/or meta-information of the network read in a previous instance, and then determining the changes to be made in the node placement or resource configuration of the storage resource.

In an aspect, the obtaining module is further configured to periodically scan the one or more nodes available in the network to obtain topology information associated with one or more nodes.

In an aspect, the obtaining module is further configured obtain, based on a triggered event, topology information associated with one or more nodes available in a network, the triggered event is any or combination of user triggered event or an automated event or a pre-configured event.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
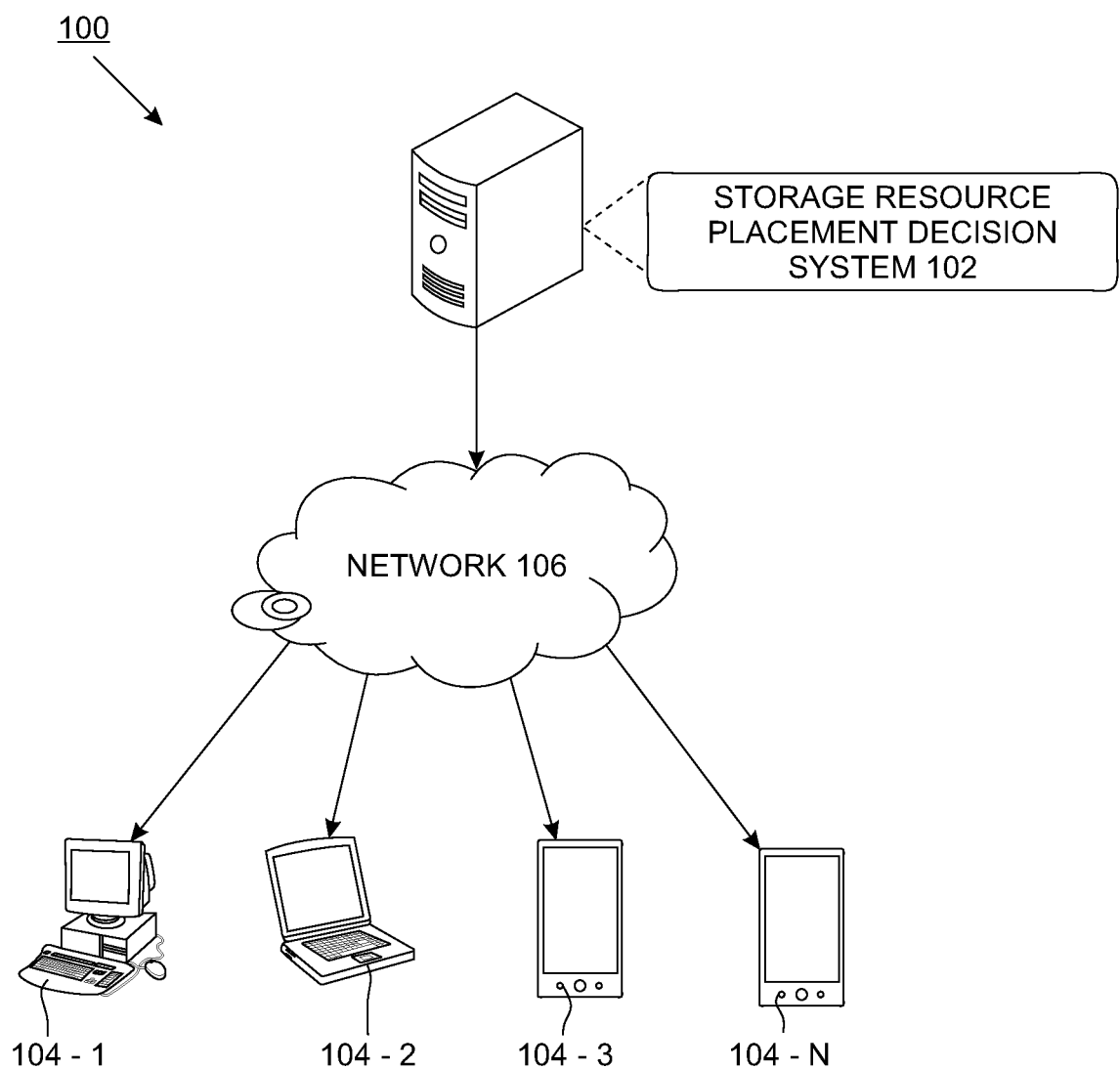
FIG. 1 illustrates a network implementation of a storage resource placement decision system to make a storage resource placement decision among one or more nodes of the network based on network topology information, in accordance with an embodiment of the present subject matter.

Systems and methods are disclosed for utilizing the network topology of the network in making storage node placement decisions. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of data placement on a storage cluster, it should be appreciated that the same has been done merely to illustrate the invention in an exemplary manner and any other purpose or function for which explained structures or configurations can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The physical topology of a network is the actual geometric layout of workstations. Nodes can be placed at various locations in a structure to distribute data and/or collect data. For example, a node can include a sensor, a wireless router, and/or a camera. During installation of nodes, a site survey team can design a network topology for the placement of the nodes. The design can be provided to a contractor, who can install the nodes according to the design. However, mistakes can be made by the contractor, resulting in an incorrect placement of one or more of the nodes.

As such, incorrect placement of a node can affect distribution and/or collection of data. For instance, an incorrectly placed wireless router can result in an area not receiving a wireless signal and/or an area receiving a degraded wireless signal. Alternatively, and/or in addition, data and/or images may not be collected from an area if a sensor and/or camera is placed in an incorrect area.

Further, the technical problems that were observed in the existing distributed, scale-out storage system was that, the systems could not consume the topology information for a L3 network and was unaware of the network's view of common failure modes, and the efficiency of paths between nodes and clients or other nodes.

Thus, there is a dire need to provide a system and method that efficiently and economically utilizes the network topology of an L3 network in making storage placement decisions.

The present invention is mainly solves the technical problems of the prior art existed. In response to these problems, the present invention provides a system and method that efficiently and economically utilizes the network topology of an L3 network in making storage placement decisions. The present invention improve efficiency and resilience of the communications between clients and nodes, and between the nodes of a distributed, scale-out storage system by participating in the topology of an L3 network.

An aspect of the present disclosure relates to a method that comprises the steps of obtaining, by a processor of an computing device, topology information associated with one or more nodes available in a network, storing, by the processor, the topology information obtained along with meta-information associated with the topology information, if any, and determining, by the processor, placement of at least storage resources on at least one node selected from the one or more nodes based on the topology information and the meta-information.

In an aspect, the step of determining further includes at least subset resources associated with the at least one node having the storage resources placed, wherein the subset resources are any or combination of a flash, a disk, and network interface types.

In an aspect, the step of determining further includes determining at least subset resources associated with the at least one node having the storage resources placed, wherein the subset resources are any or combination of a flash, a disk, and network interface types.

In an aspect, the step of determining further includes determining if the topology information and/or meta-information of the network is different than the topology information and/or meta-information of the network read in a previous instance, and then determining the changes to be made in the node placement or resource configuration of the storage resource.

In an aspect, the step of obtaining further includes periodically scanning the one or more nodes available in the network to obtain topology information associated with one or more nodes.

In an aspect, the step of obtaining further includes obtaining, based on a triggered event, topology information associated with one or more nodes available in a network, the triggered event is any or combination of user triggered event or an automated event or a pre-configured event.

An aspect of the present disclosure relates to device in a network. The device includes a non-transitory storage device having embodied therein one or more routines operable to makes a storage resource placement decision among one or more nodes of the network based on network topology information and one or more processors coupled to the non-transitory storage device and operable to execute the one or more routines.

The one or more routines include an obtaining module, a storage module, and a determination module. The obtaining module is configured to obtain topology information associated with one or more nodes available in a network. The storage module is configured to store the topology information obtained along with meta-information associated with the topology information, if any. The determination module is configured to determine placement of at least storage resources on at least one node selected from the one or more nodes based on the topology information and the meta-information.

In an aspect, the determination module is further configured to determine at least subset resources associated with the at least one node having the storage resources placed, wherein the subset resources are any or combination of a flash, a disk, and network interface types.

In an aspect, the determination module is further configured to determine if the topology information and/or meta-information of the network is different than the topology information and/or meta-information of the network read in a previous instance, and then determining the changes to be made in the node placement or resource configuration of the storage resource.

In an aspect, the obtaining module is further configured to periodically scan the one or more nodes available in the network to obtain topology information associated with one or more nodes.

In an aspect, the obtaining module is further configured obtain, based on a triggered event, topology information associated with one or more nodes available in a network, the triggered event is any or combination of user triggered event or an automated event or a pre-configured event.

FIG. 1 illustrates a network implementation of a storage resource placement decision system to make a storage resource placement decision among one or more nodes of the network based on network topology information, in accordance with an embodiment of the present subject matter.

Referring now to FIG. 1, a network implementation 100 of a storage resource placement decision system to make a storage resource placement decision among one or more nodes of the network based on network topology information is illustrated, in accordance with an embodiment of the present subject matter. In one embodiment, the storage resource placement decision system 102 provides resource placement decision among one or more nodes of the network based on network topology information.

Although the present subject matter is explained considering that the storage resource placement decision system 102 is implemented as a music player on a server, it may be understood that the storage resource placement decision system 102 may also be implemented in a variety of computing systems, such as a laptop computer, a desktop computer, a notebook, a workstation, a mainframe computer, a server, a network server, and the like. It will be understood that the storage resource placement decision system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the storage resource placement decision system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
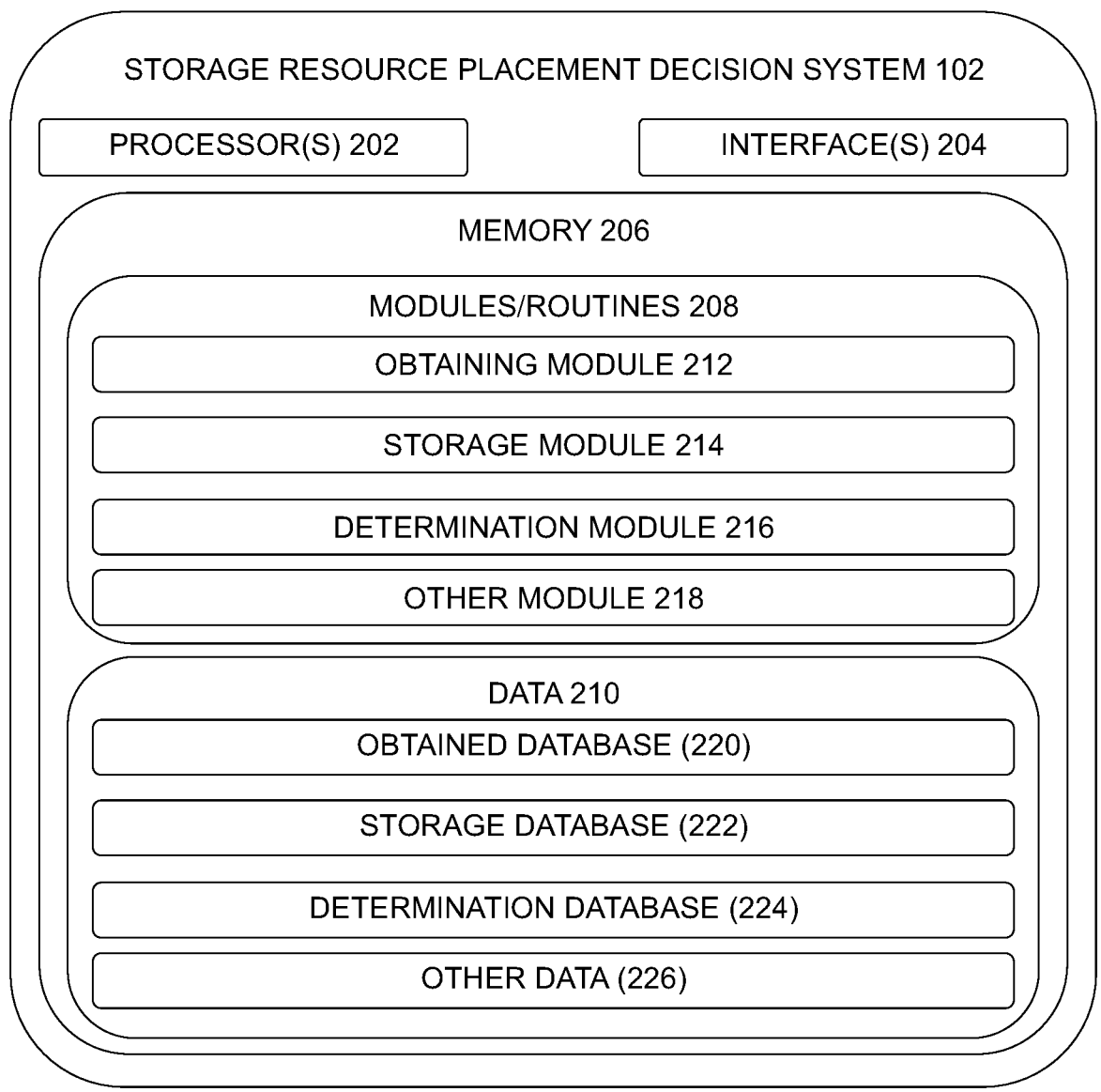
FIG. 2 illustrates the proposed system, in accordance with an embodiment of the present subject matter.

FIG. 2 illustrates the proposed system, in accordance with an embodiment of the present subject matter. Referring now to FIG. 2, the storage resource placement decision system 102 is illustrated in accordance with an embodiment of the present subject matter. In one embodiment, the storage resource placement decision system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the storage resource placement decision system 102 to interact with a user directly or through the client devices 104. Further, the I/O interface 204 may enable the storage resource placement decision system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an obtaining module 212, a storage module 214, a determination module 216, and other modules 218. The other modules 218 may include programs or coded instructions that supplement applications and functions of the storage resource placement decision system 102.

The data 210, amongst other things, serves as a repository for storing data processed, received, and generated by one or more of the modules 208. The data 210 may also include obtained database 220, storage database 222, determination database 224, and other data 226. The other data 226 may include data generated as a result of the execution of one or more modules in the other module 218.

In one implementation, the obtaining module 212 is configured to obtain topology information associated with one or more nodes available in a network. The storage module 214 is configured to store the topology information obtained along with meta-information associated with the topology information, if any. The determination module 216 is configured to determine placement of at least storage resources on at least one node selected from the one or more nodes based on the topology information and the meta-information.

In an embodiment, the obtaining module 212 obtains topology information, that may include but is not limited to, route map, zones, placement of node information etc. about an L3 data-centre network e.g. CLOS, Leaf-Spine or an L3 data-centre to data-centre network provided by a dynamic routing protocol (ex: BGP, OSPF).

In an implementation, the determination module 216 is further configured to determine at least subset resources associated with the at least one node having the storage resources placed, wherein the subset resources are any or combination of a flash, a disk, and network interface types.

In an implementation, the determination module 216 is further configured to determine if the topology information and/or meta-information of the network is different than the topology information and/or meta-information of the network read in a previous instance, and then determining the changes to be made in the node placement or resource configuration of the storage resource.

In an implementation, the obtaining module 212 is further configured to periodically scan the one or more nodes available in the network to obtain topology information associated with one or more nodes.

In an implementation, the obtaining module 212 is further configured obtain, based on a triggered event, topology information associated with one or more nodes available in a network, the triggered event is any or combination of user triggered event or an automated event or a pre-configured event.

In an embodiment, the storage resource placement decision system 102 can be implemented as control software of a distributed, scale-out storage system comprised of one or more nodes makes a storage resource placement decision among those nodes based on the network topology information provided by the dynamic routing protocol.

In an embodiment, the storage allocation decisions in a distributed, scale-out storage system may be made with awareness of the extended topology of the L3 network it is operating in order to mitigate the risk of common failure modes in a region of the network topology (ex: a single rack in the data center), and place storage in a manner which optimizes client access over an extended L3 network.

In an exemplary embodiment, the software/control software driving a dynamic routing protocol on each node makes its topology information available. This information may be updated asynchronously of any procedure in this outline. The control software of a distributed, scale-out storage system accesses the above network topology information and may store both the network topology and meta-information about the network topology.

In an exemplary embodiment, the control software of a distributed, scale-out storage system running on several nodes determines that it is necessary to or is requested to allocate a new storage resource. The topology of an L3 network is accessed by fetching the topology information available. The topology and meta-data about the topology may be used to determine which node the storage resource will be placed on and may determine which subset of node resources (ex: flash, disks, which network interfaces) are used to provide the storage resource. The control software may then direct the allocation of said storage resource.

In an exemplary embodiment, the topology of an L3 network is accessed to obtain network topology directed by periodic scans or based on an external event. If the topology or meta-data about the topology read above is different than topology or meta-data about the topology read in a previous instance of this procedure, then the control software may choose to change the node placement or resource configuration of a storage resource. If the new placement or resource allocation decision differs from the existing placement or node resource allocation for the storage resource; then the control software may direct the movement or change the node resource allocation.

In an embodiment, a distributed, scale-out storage system that can include one or more nodes with storage (ex: disks, flash) and network connections, a Distributed control software ("Control Plane"), a dynamic routing software which receives network topology information from an L3 network, storage client(s) which access control API and storage resource of the distributed, scale-out storage system, and one or more network switches and routers connected to form a network.

In an exemplary embodiment, the distributed control software can run on one or more nodes, manages the hardware and software components of the nodes, and makes storage placement decisions and communicates those decisions between nodes.

In an exemplary embodiment, Storage client(s) which access control API and storage resources can be one or more network connections, and may or may not contain similar components of the distributed, scale-out storage system.

In an exemplary embodiment, the dynamic routing software advertises paths to IP addresses.

In an embodiment, the present disclosure enables to utilize the topology of an L3 network in making storage placement decisions.

In an embodiment, the present disclosure improve efficiency and resilience of the communications between clients and nodes, and between the nodes of a distributed, scale-out storage system by participating in the topology of an L3 network.

In an embodiment, the present disclosure reduces both storage and networking costs while allowing for larger scale deployments by improving the efficiency and resilience.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

The invention claimed is:

1. A method comprising the steps of:
obtaining, by a processor of an computing device, topology information associated with one or more nodes available in a network, wherein the step of obtaining further comprises: periodically scanning the one or more nodes available in the network to obtain topology information associated with one or more nodes, wherein the topology information comprises a route map, and a plurality of zones, wherein the topology information associated with one or more nodes available in a network is obtained based on a triggered event, wherein the triggered event is any or combination of user triggered event or an automated event or a pre-configured event;
storing, by the processor, the topology information obtained along with meta-information associated with the topology information;
determining, by the processor, placement of at least storage resources on at least one node selected from the one or more nodes based on the topology information and the meta-information,
determining, by the processor, a change in the placement or a change in a resource configuration of the at least storage resources, when the topology information and meta-information of the network is different from the topology information and meta-information of the network read in a previous instance, and determining at least subset resources associated with the at least one node having the storage resources placed, wherein the subset resources are any or combination of a flash, a disk, and network interface types.

2. A device in a network, comprising:
a non-transitory storage device having embodied therein one or more routines operable to make a storage resource placement decision among one or more nodes of the network based on network topology information; and
one or more processors coupled to the non-transitory storage device and operable to execute the one or more routines, wherein the one or more routines include:
an obtaining module configure to obtain topology information associated with one or more nodes available in a network, wherein the obtaining module is further configured to periodically scan the one or more nodes available in the network to obtain topology information associated with one or more nodes, wherein the topology information comprises a route map, and a plurality of zones, wherein the topology information associated with one or more nodes available in a network is obtained based on a triggered event, wherein the triggered event is any or combination of user triggered event or an automated event or a pre-configured event;
a storage module configured to store the topology information obtained along with meta-information associated with the topology information;
a determination module configured to determine placement of at least storage resources on at least one node selected from the one or more nodes based on the topology information and the meta-information, and the determination module further configured to determine a change in the placement or a change in a resource configuration of the at least storage resources, when the topology information and meta-information of the network is different from the topology information and meta-information of the network read in a previous instance, wherein the determination module is configured to determine at least subset resources associated with the at least one node having the storage resources placed, wherein the subset resources are any or combination of a flash, a disk, and network interface types.

* * * * *